(12) United States Patent
Strege et al.

(10) Patent No.: US 7,359,775 B2
(45) Date of Patent: Apr. 15, 2008

(54) METHOD AND APPARATUS FOR INFORMATION TRANSFER IN VEHICLE SERVICE SYSTEMS

(75) Inventors: Timothy A. Strege, Sunset Hills, MO (US); David A. Voeller, St. Louis, MO (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 11/075,150

(22) Filed: Mar. 8, 2005

(65) Prior Publication Data

US 2005/0154497 A1 Jul. 14, 2005

Related U.S. Application Data

(63) Continuation-in-part of application No. 10/871,241, filed on Jun. 18, 2004, now Pat. No. 6,917,417, which is a continuation of application No. 09/880,571, filed on Jun. 13, 2001, now Pat. No. 6,754,562.

(51) Int. Cl.
*G01M 17/013* (2006.01)
*G06F 19/00* (2006.01)

(52) U.S. Cl. ............................ 701/29; 701/33; 701/36; 700/279

(58) Field of Classification Search ................ 700/279; 33/288, 286; 356/139.09, 155; 701/29, 701/32, 33, 35, 36, 41, 69; 702/182, 183, 702/184, 185, 188

See application file for complete search history.

(56) References Cited

U.S. PATENT DOCUMENTS

| | | | |
|---|---|---|---|
| 4,381,548 A | 4/1983 | Grossman et al. | |
| 4,584,487 A * | 4/1986 | Hesse et al. | 307/9.1 |
| 4,761,749 A | 8/1988 | Titsworth et al. | |
| RE33,144 E | 1/1990 | Hunter et al. | |
| 4,931,964 A * | 6/1990 | Titsworth et al. | 700/279 |
| 5,157,610 A * | 10/1992 | Asano et al. | 701/32 |
| 5,489,983 A | 2/1996 | McClenahan et al. | |
| 5,592,383 A * | 1/1997 | Rogers et al. | 700/279 |
| 5,734,569 A * | 3/1998 | Rogers et al. | 701/33 |
| 5,870,315 A | 2/1999 | January | |
| 5,892,437 A | 4/1999 | Scheibe et al. | |
| 5,916,286 A | 6/1999 | Seashore et al. | |
| 5,999,867 A * | 12/1999 | Rogers et al. | 701/29 |
| 6,085,428 A * | 7/2000 | Casby et al. | 33/286 |

(Continued)

OTHER PUBLICATIONS

"IBM joins AUTOSAR", Nov. 19, 2004, IBM, pp. 1-2, http://www-03.ibm.com/solutions/plm/doc/content/news/archive/1346006113.html?printable=yes.*

(Continued)

*Primary Examiner*—Leo Picard
*Assistant Examiner*—Charles Kasenge
(74) *Attorney, Agent, or Firm*—Polster, Lieder, Woodruff & Lucchesi, L.C.

(57) ABSTRACT

A vehicle service system having a vehicle service computer which is configured for communication with at least one on-board vehicle computer of a vehicle undergoing a vehicle service procedure via a vehicle fault tolerant communication bus, to retrieve or access information stored in a memory associated with the vehicle computer, to modify or store information in the vehicle computer associated memory, or to enable vehicle service system control of at least one vehicle component.

30 Claims, 6 Drawing Sheets

U.S. PATENT DOCUMENTS

| | | | |
|---|---|---|---|
| 6,098,296 A * | 8/2000 | Perisho et al. | 701/29 |
| 6,225,898 B1 | 5/2001 | Kamiya et al. | |
| 6,282,469 B1 * | 8/2001 | Rogers et al. | 701/29 |
| 6,330,499 B1 * | 12/2001 | Chou et al. | 701/33 |
| 6,339,736 B1 * | 1/2002 | Moskowitz et al. | 701/29 |
| 6,370,454 B1 * | 4/2002 | Moore | 701/29 |
| 6,389,337 B1 | 5/2002 | Kolls | |
| 6,405,111 B2 | 6/2002 | Rogers et al. | |
| 6,434,455 B1 | 8/2002 | Snow | |
| 6,437,692 B1 * | 8/2002 | Petite et al. | 700/108 |
| 6,501,393 B1 | 12/2002 | Richards et al. | |
| 6,556,971 B1 * | 4/2003 | Rigsby et al. | 33/286 |
| 6,574,877 B2 | 6/2003 | Gray et al. | |
| 6,577,934 B2 * | 6/2003 | Matsunaga et al. | 701/29 |
| 6,587,768 B2 | 7/2003 | Chene et al. | |
| 6,678,591 B2 * | 1/2004 | Ohmura et al. | 701/29 |
| 6,687,584 B2 | 2/2004 | Andreasen et al. | |
| 6,693,367 B1 | 2/2004 | Schmeisser et al. | |
| 6,694,234 B2 * | 2/2004 | Lockwood et al. | 701/29 |
| 6,728,603 B2 * | 4/2004 | Pruzan et al. | 701/36 |
| 6,735,504 B2 * | 5/2004 | Katagishi et al. | 701/33 |
| 6,745,151 B2 * | 6/2004 | Marko et al. | 701/35 |
| 6,754,562 B2 | 6/2004 | Strege et al. | |
| 6,826,532 B1 * | 11/2004 | Casby et al. | 704/270 |
| 6,988,026 B2 * | 1/2006 | Breed et al. | 701/29 |
| 7,082,359 B2 * | 7/2006 | Breed | 701/36 |
| 2002/0085520 A1 | 7/2002 | Sydon et al. | |
| 2003/0095038 A1 * | 5/2003 | Dix | 701/29 |
| 2003/0114980 A1 * | 6/2003 | Klausner et al. | 701/29 |
| 2004/0098616 A1 * | 5/2004 | Jenner et al. | 713/201 |
| 2004/0153223 A1 * | 8/2004 | Fujita et al. | 701/29 |
| 2004/0236487 A1 | 11/2004 | Yao et al. | |

OTHER PUBLICATIONS

"Vehicle Bus Interface", 2006, DGE Inc., http://www.dgeinc.com/pdf/DGE%20Vehicle%20Bus%20Interface.pdf.*

AUTOSAR (Automotive Open System Architecture) Development Partnership Information Pack; Jan. 21, 2003; 11 pages.

AUTOSAR—An industry wide initiative to manage the complexity of emerging Automotive E/E-Architectures; Baden-Baden; Sep. 25, 2003; 7 pages.

Automotive Controller Area Network (CAN) Applications; Freescale Semiconductor, Inc. 2004; Internet site: http://www.freescale.com; 3 pages.

International CAN Conference; CAN in passenger cars; Sep. 1, 2003 Internet site: http://www.can-cia.org; 8 pages.

FlexRay; Freescale Semiconductor, Inc. 2004; Internet site: http://www.freescale.com; 3 pages.

Fault tolerant TTCAN networks; B. Müller, Führer, F. Hartwich, R. Hugel, H. Weiler, Robert Bosch GmbH; 8 pages.

TTA-Group; TTP—Frequently Asked Questions; Copyright 2004; 18 pages.

* cited by examiner

METHOD AND APPARATUS FOR INFORMATION TRANSFER IN VEHICLE SERVICE SYSTEMS

CROSS-REFERENCE TO RELATED APPLICATIONS

This application is a continuation-in-part of, and claims priority from, U.S. patent application Ser. No. 10/871,241 filed on Jun. 18, 2004, now U.S. Pat. No. 6,917,417 herein incorporated by reference, which in turn is a continuation of U.S. patent application Ser. No. 09/880,571 filed on Jun. 13, 2001, now U.S. Pat. No. 6,754,562 issued on Jun. 22, 2004, also herein incorporated by reference.

STATEMENT REGARDING FEDERALLY SPONSORED RESEARCH

Not Applicable.

BACKGROUND OF THE INVENTION

The present invention relates generally to vehicle service systems having a computer configured to receive information to be utilized in performing a vehicle service, and more particularly, to a vehicle service system, such as a vehicle wheel alignment system, which is configured to communicate with at least one electronic control unit on-board a vehicle undergoing a vehicle service procedure via a vehicle fault tolerant communications bus.

While the present inventions will be described herein in the general context of a vehicle wheel alignment system, those of ordinary skill in the art will recognize that the concepts, features, and inventive aspects described herein are applicable to a wide variety of vehicle service devices, such as tire changing systems, tire balancing systems, engine diagnostic systems, etc. which can benefit from an ability to exchange data with, and communicate with, vehicle components.

Traditional vehicle wheel alignment systems, such as shown in U.S. Pat. No. 4,381,548 to Grossman et al., herein incorporated by reference, utilize a computing device, typically a general purpose or IBM-PC compatible computer, configured with wheel alignment software, which is connected to one or more vehicle wheel alignment angle sensors. The computing device is configured with software to compute angular relationships of the vehicle wheel, as is described in U.S. Reissue Pat. No. 33,144 to Hunter, et al. herein incorporated by reference, and typically is in communication with a variety of conventional input and output devices, such as keyboards, pointing devices, printers, displays, and audio components. Traditional vehicle wheel alignment sensors comprise angle transducers, such as shown in U.S. Pat. No. 5,489,983 to McClenahan et al., herein incorporated by reference, which are mounted to the wheels of a vehicle undergoing an alignment service, but may comprise camera systems, such as shown in U.S. Pat. No. 5,870,315 to January, herein incorporated by reference, designed to observe either the wheels themselves or targets mounted to the wheels, and to generate images from which alignment angles may be determined by the computing device.

In prior art wheel alignment systems, the individual wheel alignment sensors are connected to the computing device by means of data communication cables. As the wheel alignment systems evolved, the data communication cables have been replaced by wireless communications technologies such as infrared and radio-frequency communication links, wherein the computing device serves as a controller, transmitting instructions to the individual wheel alignment sensors, and receiving wheel alignment information in response. To avoid conflicting communications, individual wireless wheel alignment sensors employ a passive communications system which transmits information to the computing device only in response to specific instructions received there from.

In addition to requiring information from individual wheel alignment sensors, a wheel alignment system or other vehicle service system computing device requires information identifying the type of sensors which it is utilizing, information related to the vehicle undergoing service, and information identifying the manner and format of any output provided to the operator or technician. These various pieces of information are traditionally entered into the computing device manually, via the conventional input devices such as the keyboard or mouse.

Emerging wireless communication technology has enabled devices and appliances to interconnect in the form of mobile and amorphous networks capable of continually reconfiguring as elements are added and removed. Communication technology allows easy connection between devices and components, such as smart handheld devices and stand-alone equipment (i.e. general purpose computers to peripherals, etc) without the restrictions of cables or wires. Devices employing a wireless communications protocol can connect with multiple similarly configured devices located within a close proximity, forming a high-speed data network. These wireless communications protocols include user authentication, data encryption and data hopping facilities to protect privacy and to automatically prevent signal interference and loss.

Additional advancements have been made in the incorporation of electronic control units and systems in automotive vehicles such as passenger cars and light trucks. Automotive vehicles have evolved from including a single electronic control unit configured to perform engine management applications to complex systems incorporating fifty or more separate electronic control units which monitor, regulate, and control all aspects of automotive vehicle electronic systems. These systems may include, for example, engine management, fuel regulation, exhaust gas monitoring, passenger compartment climate control, lights, anti-lock braking systems, power windows and locks, and vehicle alarm systems. Additional advances in automotive vehicles have led to the proliferation of "by-wire" systems in which vehicle components previously controlled directly by a mechanical linkage are replaced by systems incorporating one or more actuating elements which are responsive to electronic signals received from an operator.

An example of a "by-wire" system is a "steer-by-wire" system in which the vehicle steering wheel is no longer mechanically coupled to the vehicle wheel steering mechanisms, such as shown in U.S. Patent Application Publication No. 2004/0236487 A1 to Yao et al. With a "steer-by-wire" system, movement of a vehicle steering device is detected by sensors, and corresponding signals are relayed to a vehicle steering device control unit. The steering device control unit in turn, determines an appropriate degree of turn to impart on the vehicle wheels to achieve the desired vehicle steering, given the vehicle's current operating conditions, and provides corresponding control signals to vehicle wheel steering actuators. One advantage of a steer-by-wire system is the ability of the steering device control unit to provide an optimal steering of the vehicle wheels for different vehicle operating conditions, for example, altering the sensitivity of the vehicle steering system based on the vehicle's ground speed.

Additional examples of "by-wire" systems include brake-by-wire systems, throttle-by-wire, shift-by-wire, and suspension-by-wire, each of which typically includes at least one electronic control unit and is often dependent upon data and sensor readings acquired by other electronic systems on-board the vehicle.

The increasing complexity and interaction between various electronic control units in an automotive vehicle has led to the development of advanced in-vehicle communication networks or communication busses which enable the various electronic control units to communicate in a redundant and controlled manner using a common communication protocol. An additional requirement of these in-vehicle communication networks and communication busses is the ability to be fault tolerant in such a way that electronic control units of the various by-wire systems can identify, in real-time, faults or non-functioning components in the vehicle systems. Examples of in-vehicle network communication networks and buses which enable high-speed fault-tolerant communication between various vehicle electronic control units include intrinsically redundant systems such as FlexRay network communication systems and TTP systems, as well as multi-bus systems such as Time Triggered Controller Area Network (TTCAN) systems. Network communication systems utilizing time-division multiple-access protocols, such as Byteflight, are additionally utilized in vehicle applications.

An additional emerging standardization within the automotive industry for in-vehicle electronic systems and communications is identified as the Automotive Open System Architecture (AutoSAR) standard. The AutoSAR standard is based on standardized software interfaces for vehicle electronic components which support the exchangeability of software components within the vehicle electronic components, and which are independent of the specific hardware configuration of the vehicle electronic component. By specifying the software interfaces for vehicle electronic components, the AutoSAR standard enables the use of a standard library of functions and formats for communication and control of individual vehicle electronic components. For example, a first electronic control unit in a vehicle may be configured to access a remote sensor to obtain a measure of vehicle speed. Using the AutoSAR standard, the electronic control unit can then communicate the data value over an in-vehicle communication network or bus to a second electronic control unit such as an engine throttle management controller or a cruise control unit without the need to reformat the data depending upon the specific function of the second electronic control unit.

Other communication busses, which are not necessarily fault-tolerant busses, are utilized in vehicles. For example, the media-oriented systems transport (MOST) bus, and the local interconnect network (LIN) bus are frequently used for user interfaces such as entertainment systems, mirror controls, seat controls, etc. Commands relayed to interconnected vehicle components over these communication busses enable control of vehicle features such as the setting or resetting of service indicator lights, driver warning lights, and other low-priority vehicle functions.

Accordingly, it would be advantageous to provide a vehicle service device, such as a vehicle wheel alignment system, with the necessary components to communicate with one or more vehicle electronic control units and controlled components via the advanced in-vehicle network present in a vehicle undergoing a service procedure, thereby enabling the vehicle service device to extract data from one or more electronic control units, reset control or fault codes in the electronic control units, or to directly control vehicle functions or components as required to complete a vehicle service procedure.

BRIEF SUMMARY OF THE INVENTION

Briefly stated, in one aspect, the present invention comprises an improved vehicle service system configured to interface with an in-vehicle network of a vehicle undergoing a service procedure for active communication with any of a variety of vehicle components and electronic control units in the vehicle which are operatively coupled to the in-vehicle network.

In an alternate embodiment, the present invention comprises an improved vehicle wheel alignment system having a computing device which is configured to communicate with at least one component on-board a vehicle being serviced by means of an established communication link to a fault-tolerant in-vehicle communications network. The improved vehicle wheel alignment system is further configured to retrieve information from, or to store information in, a memory associated with the vehicle component via the fault-tolerant in-vehicle communications network. Such information may include, but is not limited to, OEM vehicle alignment specifications, vehicle operating parameters, previous vehicle alignment measurements, current vehicle alignment measurements, and control codes.

In an alternate embodiment, the present invention comprises an improved vehicle wheel alignment system having a computing device which is configured to communicate with at least one component on-board a vehicle being serviced by means of an established communication link to a fault-tolerant in-vehicle communications network. The improved vehicle wheel alignment system is further configured to control the operation of at least one vehicle component via commands conveyed over the fault-tolerant in-vehicle communications network.

In an alternate embodiment, the present invention comprises an improved vehicle wheel alignment system having a computing device which is configured with at least one Automotive Open System Architecture (AutoSAR) software module. The AutoSAR software module is adapted for communicating with at least one AutoSAR software module associated with a component on-board a vehicle being serviced through an established communications link to an in-vehicle communications network.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
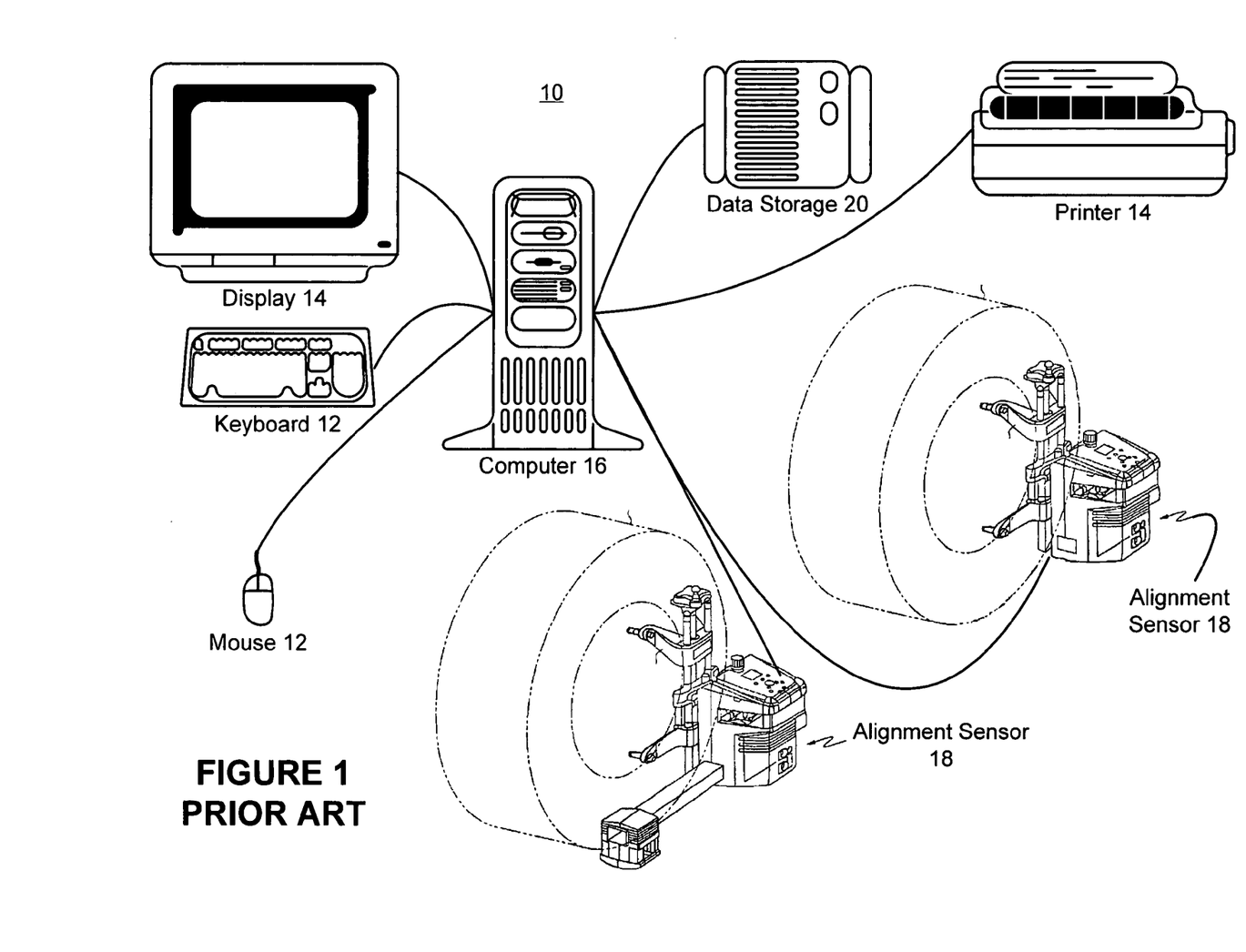
FIG. 1 is an overview of prior art components in a vehicle wheel alignment system.

Turning to the figures, there is shown the components of a conventional vehicle wheel alignment system generally at 10. The vehicle alignment system 10 includes at least one input device 12, such as a keyboard, mouse, microphone, or touch screen, for use by an operator or technician (not shown) to communicate with the vehicle alignment system 10, and at least one output device 14, such as a display or audio speaker for the alignment system 10 to convey information to the operator or technician.

Depending upon the needs of the operator or technician, the input and output devices may include, but are not limited to, one or more of the following conventional devices such as a keyboard, a pointing device, a remote control device, a monitor or LCD display, or audio components. The devices can be integrated together in a console, or located separately, again depending upon the needs of the operator and the configuration of the wheel alignment system 10.

The input devices 12 and output devices 14 are in communication with a computing device 16 such as a wheel alignment computer, operating under control of one or more software programs or components. The computing device 16 can be any computing device used with systems of complexity similar to that of a vehicle wheel alignment system. For example, a micro-processor, a micro-controller, a digital signal processor having sufficient computing power, or a general purpose computer can be used as the computing device. Of course, any equivalent device, i.e. one capable of executing the requisite software programs or components, can also be used. Communication between the input devices 12, output devices 14, and the computing device 16 can be performed electronically or electro-magnetically (including optical communications such as infrared system), or by any combination thereof.

The computing device 16 of the vehicle wheel alignment system 10 is additionally suitably connected to at least one alignment angle sensing device 18 for obtaining measurements of the various alignment angles and/or characteristics of a vehicle under test. The sensing devices 18, depending upon the application and requirements, can be electronic, electromechanical, or optical. The sensing devices 18 can be hard-wired to the computing device 16 for communication therewith, or can be in communication with the computing device 16 in any other suitable manner, such as through infrared or radio-frequency communication.

In addition to the input devices 12, output devices 14, and sensing devices 18, the computing device 16 of the vehicle wheel alignment system 10 can be configured with access to an internal or external data storage component (collectively identified as 20), and to various peripheral components, such as printers, CD-ROM drives, DVD-drives, and/or a communications network such as the Internet.

Figure 2:
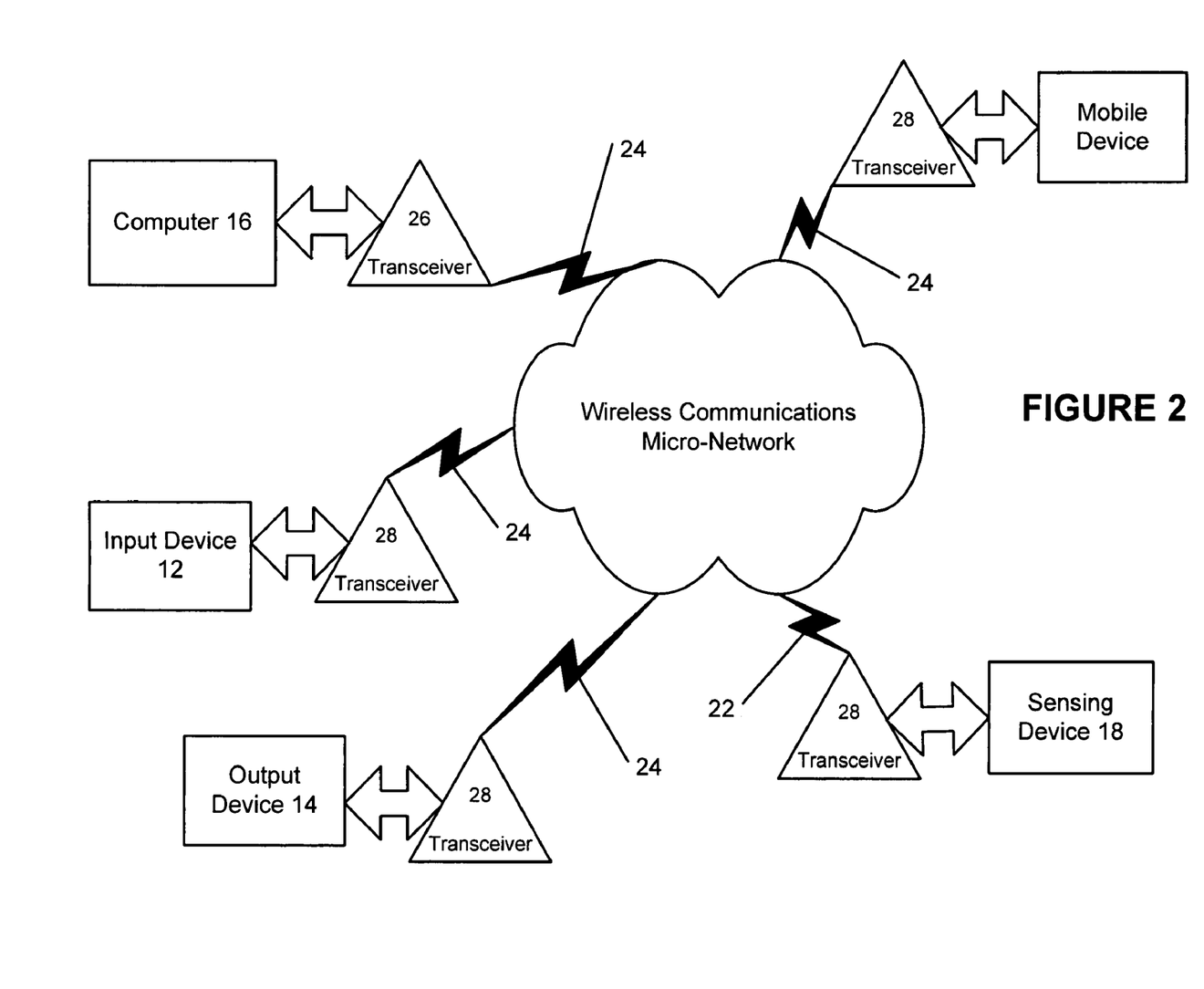
FIG. 2 is block diagram illustrating various components of a vehicle wheel alignment system of the present invention linked to a wireless communications micro-network.

It is preferred that at least one of the communication links between the computing device 16 and either the input devices 12, output devices 14, and sensing devices 18 be a wireless communications link. Such communications links are shown in FIG. 2, in which the links between the computing device 16 and at least one sensing device 18 are labeled 22, and the link between the computing device 16 and an input or output device is labeled 24.

In an embodiment of the present invention, a wireless communications system and protocol is employed to automatically establish the wireless communications link 22 and/or 24, forming a wireless micro-network such as a piconet, comprising a number of communicating devices sharing a communications link, or a scatternet, comprising two or more interconnecting piconets. Any of a variety of wireless communications systems and protocols may be employed for establishing the wireless communication link between devices to form a micro-network. Such systems and protocols, which can be employed with the present invention include HomeRF and Wireless Fidelity, also known as Wi-Fi, or the IEEE 802.11b and IEEE 802.11g standards, although such systems and protocols may not automatically establish communication links, but rather require individual links to be manually initiated.

A vehicle wheel alignment system 10 of the present invention can include wireless communications links with both fixed and mobile devices to establish a micro-network. For example, the transceiver 26 associated with the wheel alignment system 10 is fixed, while a second transceiver 28 associated with a portable display unit is mobile. Devices with which the vehicle wheel alignment system 10 of the present invention can establish a communications link include, but are not limited to computers associated with a vehicle 100 undergoing service, customer computers (laptops and PDAs), input and/or output devices, and other vehicle service equipment.

Figure 3:
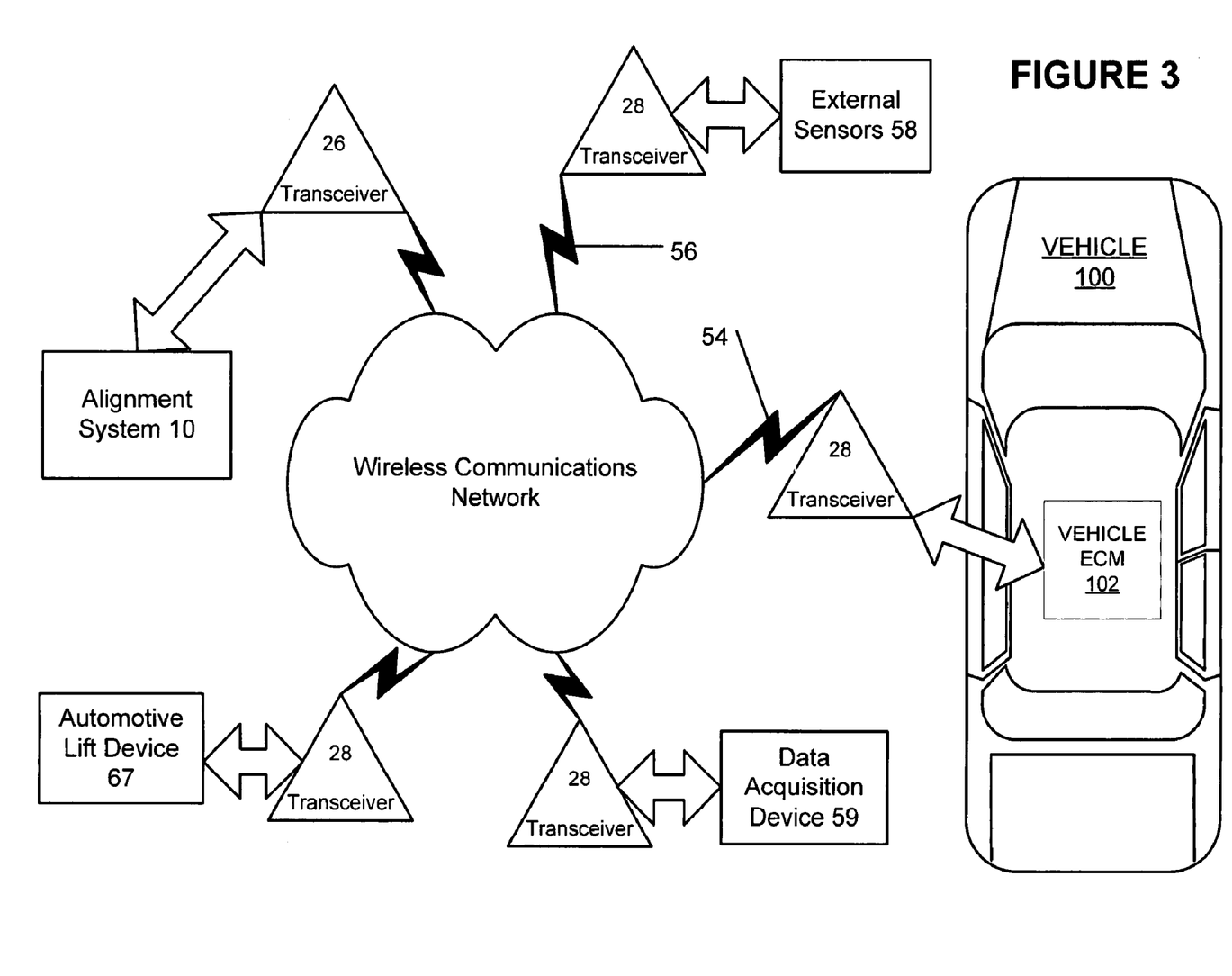
FIG. 3 is a block diagram illustrating exemplary external systems which may be in wireless communication via a micro-network with a wheel alignment system of the present invention.

For example, wireless communications links 56 can be established to one or more external sensors 58 and data acquisition devices 59 utilized to acquire data and measurements related to the vehicle 100, or vehicle service devices such as a vehicle lift 67. Individual wheel-mounted alignment angle sensors can be provided with suitable transceivers and communications protocol to establish communication links to the wireless micro-network, rendering sensor data and measurements available to any similarly connected components as well as permitting the vehicle wheel alignment system 10 to control the sensors.

When a vehicle 100 equipped with a suitable transceiver 28 is brought into proximity with a vehicle wheel alignment system 10 of the present invention configured with a transceiver 26 and suitable communications protocols, a communications link may be established between the vehicle 100 and the alignment system 10. For a motor vehicle 100, the suitable transceiver 28 can comprise a self-contained device built in to the vehicle systems, or may comprise a detachable unit designed to plug in to an access point to the vehicle's diagnostic systems, thereby providing wireless access thereto. Utilizing a wireless communications link, the vehicle wheel alignment system 10, or other vehicle service system, can obtain required information directly from the vehicle 100 without the need for the operator or technician to manually enter the data or connect cables from the vehicle's computers to the alignment system. However, those of ordinary skill will recognize that a vehicle wheel alignment system 10 of the present invention may function within the scope of the invention as described herein, to exchange information with the components of a vehicle 100 via a cabled communication link coupled to the vehicle 100

Information which can be exchanged or communicated between a vehicle wheel alignment system 10 (or other vehicle service device) and a vehicle 100 may include, but is not limited to, diagnostic information stored in an electronic control module (ECM) 102 of the vehicle, the vehicle identification number (VIN), vehicle tire pressure from associated pressure sensors, stored error codes, steering wheel position encoder signals, electronic ride-height system signals, rear wheel steering information, brake actuation signals, engine status information, power steering status information, throttle position sensor signals, braking system status, braking hydraulic pressure readings, brake pedal pressure, radar sensor aiming information, vision sensor aiming information, headlight aiming information and vehicle wheel speed.

Additional information which can be stored in a vehicle ECM 102, and communicated to the vehicle wheel alignment system 10 or other vehicle service device over the wireless communications link may include vehicle specifications and previous vehicle service information such as previous alignment measurements, last service date, and the name or location of the service shop performing the last vehicle service.

In addition to receiving information from a vehicle 100, the vehicle wheel alignment system 10, or other vehicle service system, can communicate via the wireless communications micro-network or direct connection with the ECM's 102, integrated sensors, and other linked components on the vehicle 100 to direct their operation, or to store data in an onboard vehicle storage memory. For example, upon completion of a vehicle wheel alignment procedure, the vehicle wheel alignment system 10 of the present invention can communicate the vehicle's current alignment measurements to a vehicle storage memory via the wireless communications micro-network or direct connection.

Figure 4:
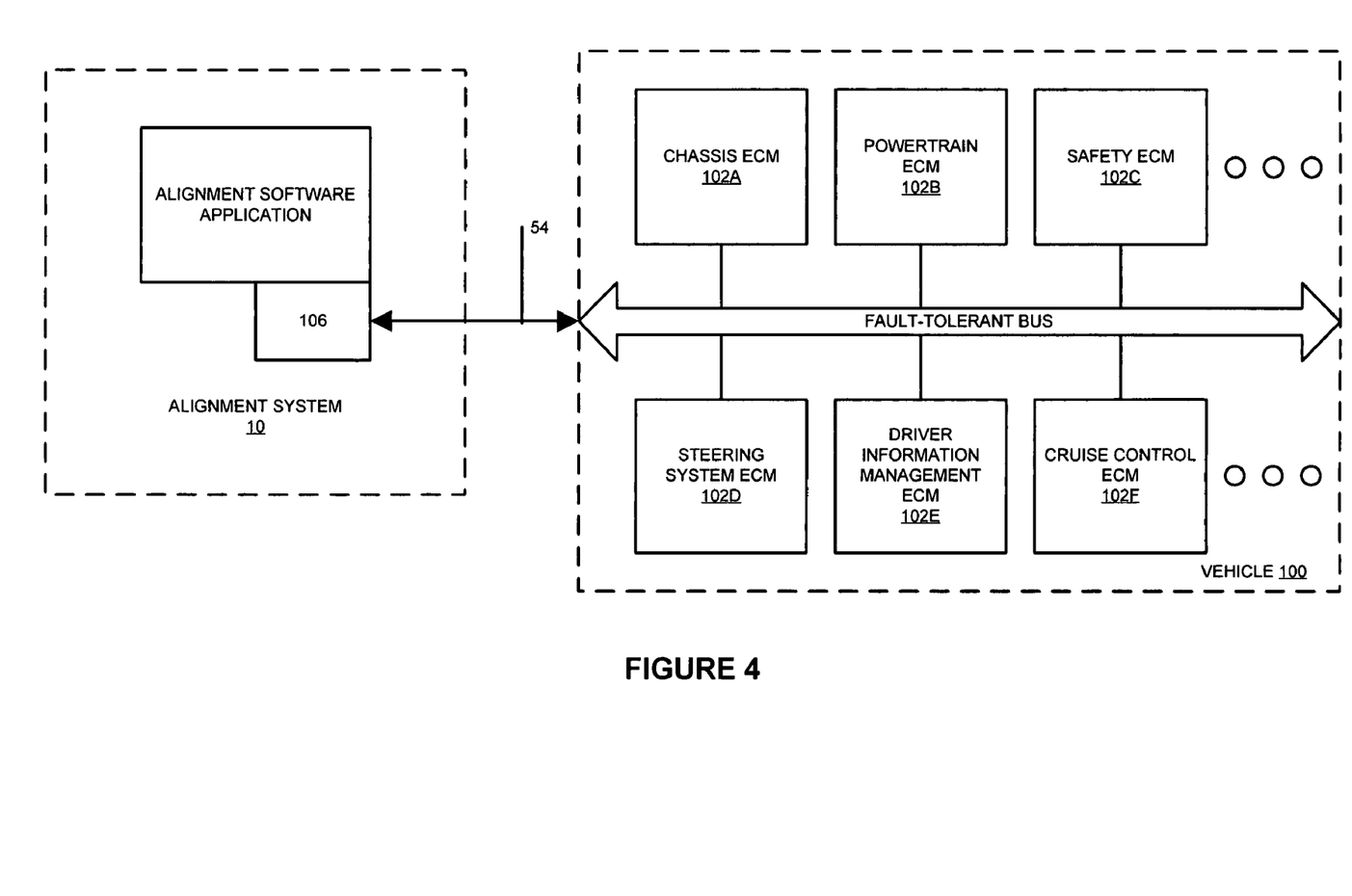
FIG. 4 is a simplified block diagram of a vehicle wheel alignment system of the present invention in communication with a fault-tolerant bus on a vehicle.

While the communications described above may be carried out directly between a vehicle wheel alignment system 10 and a vehicle ECM 102, preferably, a communication link 54 is established from the vehicle wheel alignment system 10 to a fault-tolerant in-vehicle communications network or bus 104 such as a FlexRay, TTCAN, or TTP in-vehicle communications network, on which multiple vehicle electronic control modules 102 or units and sensors communicate. The connection enables the vehicle wheel alignment system 10 to access multiple electronic control modules 102, vehicle components, and sensors directly, as shown in FIG. 4. The communications link 54 to the fault-tolerant in-vehicle communications network or bus 104 may be a wireless link established between suitable transceivers coupled to the fault-tolerant bus 104 and the vehicle wheel alignment system 10, or a direct connection from the vehicle wheel alignment system 10 to an available access port linked to the fault-tolerant bus 104.

Information acquired from the vehicle 100 through the communication link 54 to the fault tolerant bus 104 may include the vehicle VIN, prior service history, current vehicle status, operational parameters, live vehicle sensor readings, and any information stored in an on-board vehicle memory storage accessible through the fault tolerant in-vehicle communications network. Similarly, commands and instructions to an electronic control module 102 or component on the vehicle 100, or to a linked on-board vehicle system may be communicated from the vehicle wheel alignment system 10 through the fault tolerant bus 104 over the communication link 54.

In one embodiment of the present invention, shown in FIG. 4, the vehicle wheel alignment system 10 is configured with a suitable communication system 106 for establishing the communications link 54 to a fault-tolerant bus 104 on a vehicle 100, which may be a FlexRay, TTCAN, or TTP in-vehicle communications network. The vehicle wheel alignment system 10 is configured with at least one alignment software application configured to communicate with at least one electronic control module 102 linked to the fault-tolerant bus 104 in the vehicle 100. Electronic control modules on the vehicle 100 may include, for example, a chassis ECM 102A, a power train ECM 102B, a safety system ECM 102C, a steering system ECM 102D, a driver information management ECM 102E, a cruise control system ECM 102F, and the like. The communication link 54 is established either at the start of a vehicle service procedure, or as required during a vehicle service procedure, and is terminated upon completion of the vehicle service procedures.

Figure 5:
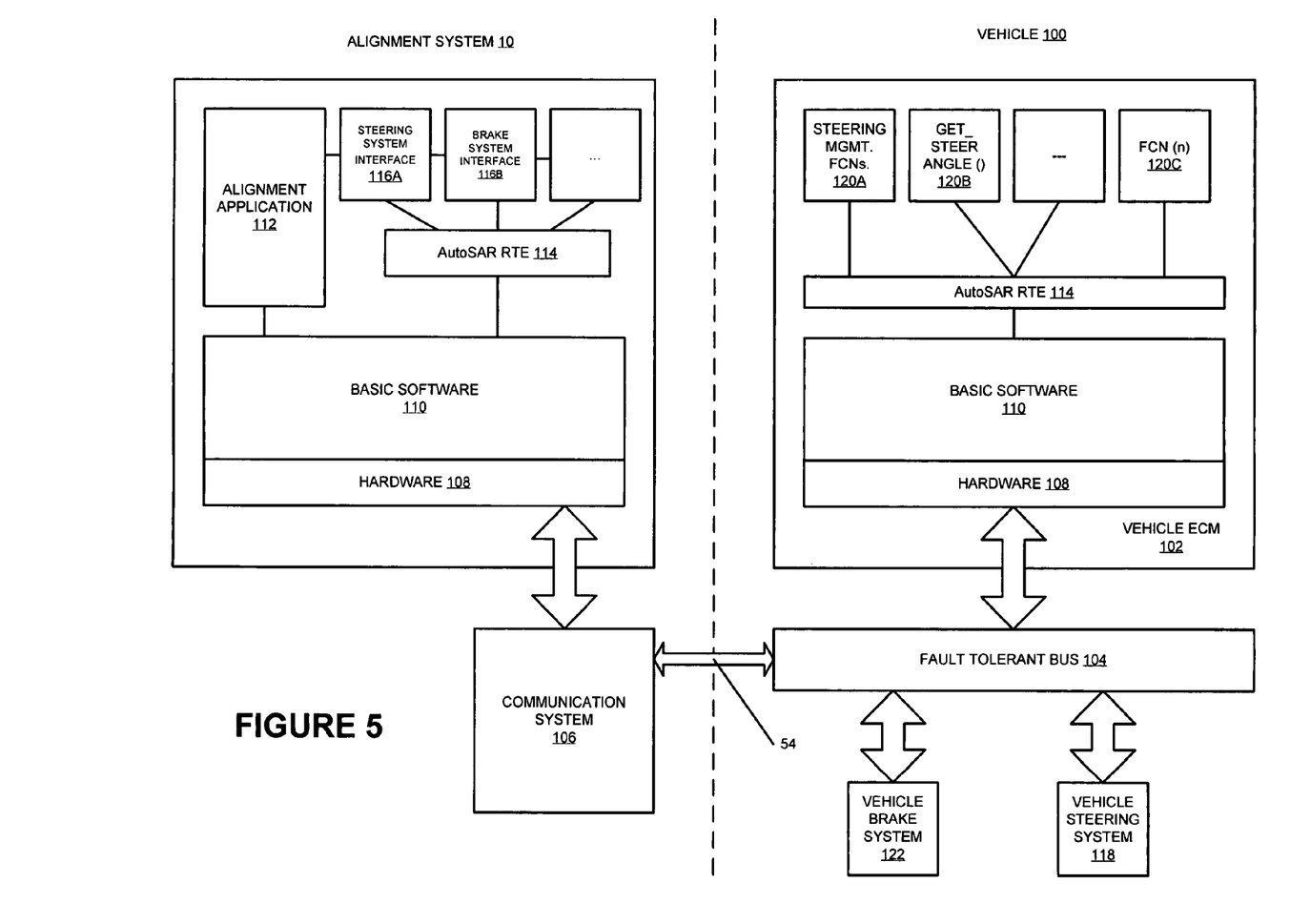
FIG. 5 is a block diagram representing the interaction of wheel alignment system components of one embodiment of the present invention with components of a vehicle electronic control unit.

Turning to FIG. 5, an embodiment of the vehicle wheel alignment system 10 of the present invention is shown configured with an Automotive Open Systems Architecture (AutoSAR) interface 114. The vehicle wheel alignment system 10 is adapted to communicate through a communication system 106 with at least one electronic control module 102, component, or on-board system in a vehicle 100 which is similarly configured with an AutoSAR interface 114 using communication formats and software function calls which are independent of the specific hardware configuration of the vehicle or the vehicle components. The vehicle wheel alignment system 10, and electronic control modules 102, each include a processor or other suitable hardware systems 108, configured with basic operating system software 110 as required for conventional functionality. At least one vehicle wheel alignment software application 112 is included in the vehicle alignment system 100 to implement wheel alignment procedures and functions.

Within the vehicle wheel alignment system 100, one or more individual software interfaces 116, such as a steering system data acquisition/control interface 116A or a brake system data acquisition/control interface 116B, are configured to utilize the AutoSAR interface 114 to communicate with software modules or functions 120 associated with an electronic control module 102 in a vehicle 100 using communication formats and software function calls which are independent of the specific hardware configuration of the vehicle or the vehicle components.

For example, during operation of the vehicle wheel alignment system 100, after establishment of the communications link 54 to the fault-tolerant bus 104 of a vehicle 100, the alignment application 112 may initiate a request for data from the steering system 118 of the vehicle 100, or direct the vehicle to carry out a requested operation. In one embodiment, the request is passed to a steering system interface 116A configured to communicate the request through the AutoSAR interface 114 and fault tolerant bus 104 to a steering system management software module or functions 120A associated with an electronic control module 102 in the vehicle. The steering system management software module or function 120A receives the request through the AutoSAR interface 114 associated with the electronic control module 102, and responds according to obtain the requested data from the steering system 118, or to direct the steering system 118 to carry out a requested operation.

By utilizing the steering system interface 116A to communicate the request through the AutoSAR interface 114, the vehicle alignment system 10 is not required to alter the request based on the specific make or model of the vehicle 100, or maintain an extensive database of communication protocols specific to individual vehicle makes or models. The AutoSAR interface 114 provides a standard for functional operations across multiple systems within the vehicle 100, such that the vehicle wheel alignment system 10 can access the functionality of components linked to the vehicle fault tolerant bus 104 in a transparent manner.

Examples of operation which can be carried out by a vehicle wheel alignment system 10 in communication with a vehicle ECM 102 via the fault-tolerant bus 104 include identifying a current steering ratio on a vehicle 100 equipped with a system capable of altering the steering ratio, directing the vehicle wheels to steer through a specific arc on a vehicle equipped with a steer-by-wire system, or directing actuation of the vehicle brakes on a vehicle equipped with a brake-by-wire system. Those of ordinary skill in the art will readily recognize that by enabling a vehicle wheel alignment system 10 to communicate with any vehicle component coupled to a fault tolerant communication bus 104 on the vehicle using standard communication protocols and format, the vehicle wheel alignment system 10 can be configured to exchange a wide range of information and data with the various vehicle systems, and to control or direct the operation of individual vehicle systems as required to complete or carry out a vehicle service procedure.

Figure 6:
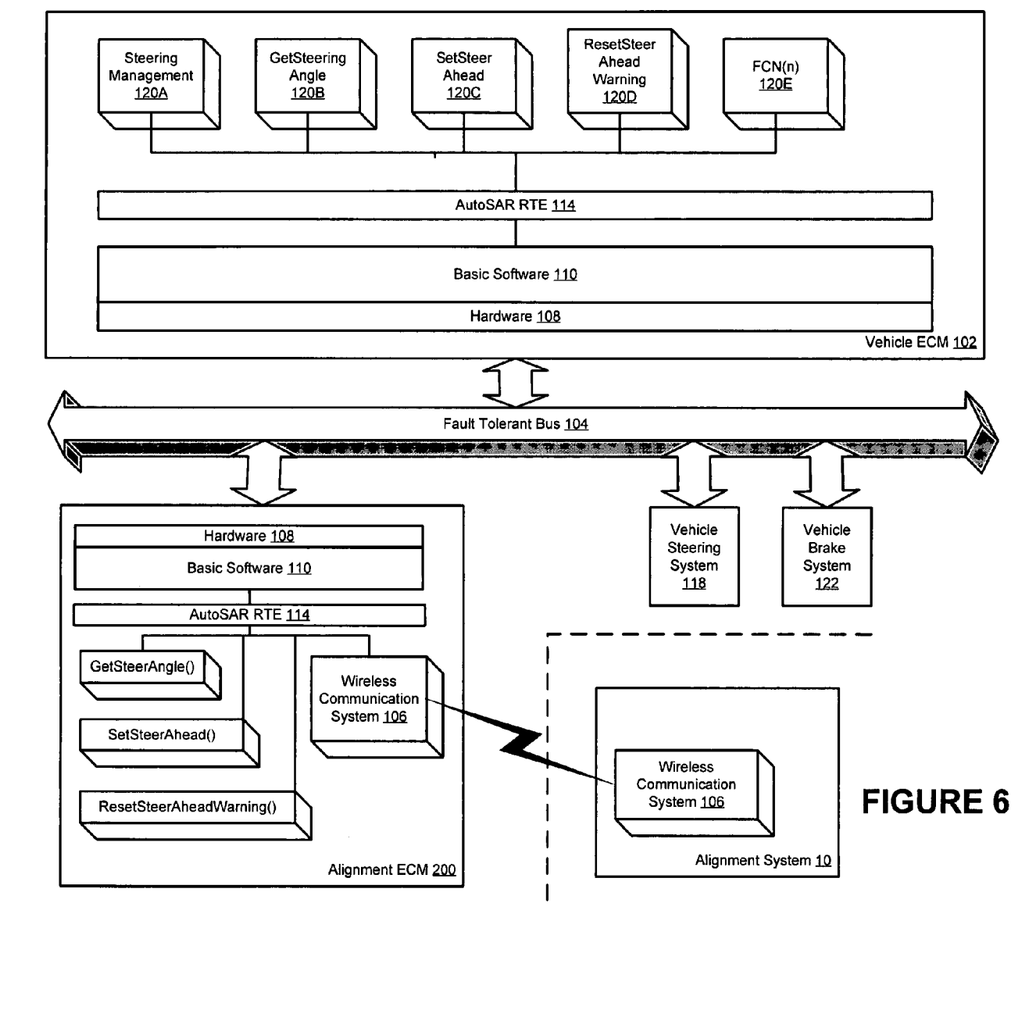
FIG. 6 is a simplified block diagram of an alignment system ECM of the present invention configured to link a vehicle wheel alignment system with a fault-tolerant bus on a vehicle.

Turning to FIG. 6, an embodiment of the present invention is shown in which an alignment system electronic control module 200 is removably coupled to the fault tolerant bus 104 of a vehicle 100. The alignment system ECM 200 contains the functional components and software instructions necessary to communicate with other vehicle components such as vehicle ECMs 102 over the fault tolerant bus 104. Preferably, the alignment ECM 200 is configured with the wireless communication system 106 for establishing a communication link to the vehicle wheel alignment system 10. During use, the alignment system electronic control module 200 functions as an interface between the alignment system 10 and the various vehicle components linked by the fault tolerant bus 104, enabling the alignment system 10 to receive data from the vehicle components, or to direct the operation of the vehicle components, as required to complete a vehicle alignment procedure.

Those of ordinary skill in the art will recognize that any of a variety of different means may be utilized to achieve communication between the vehicle wheel alignment system 10 and the fault tolerant bus 104 of a vehicle 100, provided that an exchange of data between the vehicle wheel alignment system and at least one vehicle component linked to the fault tolerant bus 104 is enabled utilizing a standardized communications protocol or format.

While the present invention has been described in the specific context of a vehicle wheel alignment system 10, those of ordinary skill in the art will recognize that in the broader scope, the inventive concepts and features described herein can be readily utilized with a wide variety of vehicle service devices, including vehicle tire balancing systems and vehicle tire changing systems, to enable the vehicle service device to communicate with vehicle components coupled to a fault tolerant communication bus.

For example, some automotive vehicles are equipped with tire pressure monitoring systems which are capable of measuring loaded imbalances in the wheel assemblies of a vehicle using accelerometer sensors in addition to pressure and temperature sensors located within the individual wheel assemblies. A vehicle tire balancing system or tire changing system configured with the features of the present invention could communicate with the vehicle tire pressure monitoring system through a connection to the vehicle's fault tolerant communication bus, and retrieve stored loaded imbalance data which may then be used to carry out a wheel assembly service procedure, such as an imbalance measurement or imbalance correction.

Similarly, some vehicles which incorporate steer-by-wire systems have the capability of measuring and recording lateral forces exerted on, and by, the steering system components and actuators together with the applied weight loaded onto each vehicle wheel assembly. A vehicle tire balancing system or tire changing system configured with the features of the present invention could communicate with the vehicle steering system through a connection to the vehicle's fault tolerant communication bus, and retrieve stored lateral force data and applied weight data, which may then be used to carry out a wheel assembly service procedure, such as an imbalance measurement or imbalance correction, or to correlate with lateral force measurements obtained directly by the vehicle service equipment.

The present invention can be embodied in part in the form of computer-implemented processes and apparatuses for practicing those processes. The present invention can also be embodied in part in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. An improved vehicle wheel alignment system which is external to a vehicle undergoing service, the system having a computing device, an associated display, and at least one vehicle wheel alignment sensor configured for communicating wheel alignment data to the computing device for alignment angle processing by the computing device, said improvement comprising:
- a communication means for operatively coupling the computing device of the external vehicle wheel alignment system to an internal communication bus integrated into the vehicle undergoing service to enable a bi-directional exchange of data between the computing device and at least one internal vehicle component which is operatively coupled to said vehicle internal communication bus; and
- wherein the computing device of the external vehicle wheel alignment system is configured with a software application to direct an operation of said at least one vehicle component through said vehicle internal communication bus.

2. The improved vehicle wheel alignment system of claim 1 wherein said communication means is configured for operatively coupling said computing device to a FlexRay internal communication bus of an automotive vehicle.

3. The improved vehicle wheel alignment system of claim 1 wherein said communication means is configured for operatively coupling said computing device to a TTCAN internal communication bus of an automotive vehicle.

4. The improved vehicle wheel alignment system of claim 1 wherein said communication means is configured for operatively coupling said computing device to a TTP internal communication bus of an automotive vehicle.

5. The improved vehicle wheel alignment system of claim 1 wherein the computing device is further configured with said software application to control said at least one vehicle component through said communication means.

6. The improved vehicle wheel alignment system of claim 1 wherein the computing device is further configured with a software application to set at least one operating parameter for at least one vehicle component through said communication means.

7. The improved vehicle wheel alignment system of claim 1 wherein said communication means includes at least one wireless communications transceiver configured to establish a wireless communications link with at least one additional wireless communications transceiver operatively coupled to said vehicle internal communication bus.

8. The improved vehicle wheel alignment system of claim 1 wherein said computing device is configured to utilize said vehicle internal communication bus to:
- selectively receive data from at least one vehicle component,
- to selectively store updated data in a memory associated with at least one vehicle component, and
- to selectively control an operation of at least one vehicle component.

9. An improved vehicle wheel alignment system which is external to a vehicle undergoing service, the system having a computing device, an associated display, and at least one vehicle wheel alignment sensor configured for communicating wheel alignment data to the computing device, said improvement comprising:
- a communication means for operatively coupling the computing device to an internal communication bus of the vehicle undergoing service to enable an exchange of data between the computing device and at least one vehicle component operatively coupled to said vehicle communication bus; and
- wherein the computing device is further configured to exchange AutoSAR-standard data with at least one vehicle component via said communications means.

10. The improved vehicle wheel alignment system of claim 9 wherein said computing device is further configured with at least one AutoSAR software interface for communicating with at least one vehicle component coupled to said vehicle communication bus.

11. The improved vehicle wheel alignment system of claim 9 wherein said communication means includes an electronic control module operatively coupled to the computing device and operatively coupled to said vehicle communication bus, said electronic control module configured to enable an exchange of data between the computing device and at least one vehicle component operatively coupled to said vehicle communication bus.

12. The improved vehicle wheel alignment system of claim 11 wherein said electronic control module is further configured with at least one AutoSAR software interface.

13. A method for transferring during a vehicle service procedure, information between a vehicle service system which is external to, and independent from, a vehicle undergoing service, and at least one electronic component of the vehicle operatively coupled to an in-vehicle communications network comprising:
- establishing, during the vehicle service procedure, a bi-directional communications link directly between said vehicle service system and said in-vehicle communications bus operatively coupling a plurality of vehicle components for communication there between;
- identifying at the external vehicle service system, said at least one electronic vehicle component operatively coupled to communicate over said in-vehicle communications bus; and
- transferring, over said in-vehicle communications bus, information associated with the vehicle service procedure between said at least one electronic component and the external vehicle service system.

14. The method of claim 13 for transferring information between a vehicle service system and at least one electronic component of a vehicle wherein the step of establishing a bi-directional communications link includes establishing a wireless communications link between said vehicle service system and said in-vehicle communications bus.

15. The method of claim 13 for transferring information between a vehicle service system and at least one electronic component of a vehicle wherein said step of establishing a bi-directional communications link further includes operatively coupling said vehicle service system to an access point associated with said in-vehicle communications bus.

16. The method of claim 13 for transferring information between a vehicle service system and at least one electronic component of a vehicle wherein said information includes at least one command to direct an operation of said electronic component.

17. The method of claim 13 for transferring information between a vehicle service system and at least one electronic component of a vehicle wherein said information includes at least one data value acquired by said electronic component.

18. The method of claim 13 for transferring information between a vehicle service system and at least one electronic component of a vehicle wherein said electronic component is a vehicle steering system control unit.

19. The method of claim 13 for transferring information between a vehicle service system and at least one electronic component of a vehicle wherein said electronic component is a vehicle brake system control unit.

20. The method of claim 13 for transferring information between a vehicle service system and at least one electronic component of a vehicle wherein said electronic component is a vehicle stability system control unit.

21. The method of claim 13 for transferring information between a vehicle service system and at least one electronic component of a vehicle wherein said electronic component is a tire pressure monitoring system module.

22. The method of claim 13 for transferring information between a vehicle service system and at least one electronic component of a vehicle wherein said electronic component is a sensor operatively coupled to measure a parameter associated with the vehicle.

23. The method of claim 13 for transferring information between a vehicle service system and at least one electronic component of a vehicle wherein said vehicle service system is a vehicle wheel alignment system.

24. A method for transferring information between a vehicle service system which is external to a vehicle undergoing a service procedure and at least one electronic component of the vehicle which is operatively coupled to an in-vehicle communications bus comprising:
  establishing a communications link directly between the external vehicle service system and the in-vehicle communications bus;
  identifying said at least one electronic component on the in-vehicle communications bus;
  transferring, on said in-vehicle communications bus, information between said at least one electronic component and the external vehicle service system; and
  further including the step of formatting said information to an AutoSAR interface standard prior to transferring said information between said at least one electronic component and the external vehicle service system.

25. An improved vehicle service system which is external to a vehicle, the vehicle service system having a computing device configured with at least one vehicle service software application, the improvement comprising:
  a bi-directional communication interface operatively coupled to the computing device, said communication interface configured to operatively couple the computing device to an internal communication bus integrated into a vehicle; and
  wherein the computing device is further configured with at least one software application to communicate over said vehicle internal communication bus directly with at least one component of the vehicle coupled to said internal communication bus through said bi-directional communication interface.

26. The improved vehicle service system of claim 25 wherein said computing device is configured to receive vehicle wheel alignment data from a vehicle wheel alignment sensor; and
  wherein said computing device is configured with at least one vehicle wheel alignment software application.

27. A method for communicating between a vehicle service system external to a vehicle and at least one internal component of a vehicle operatively coupled to a vehicle internal communication bus, comprising;
  establishing a direct bi-directional communication link between the vehicle service system and the vehicle internal communication bus; and
  transferring data between the vehicle service system and the at least one vehicle component over said vehicle internal communication bus utilizing said established bi-directional communication link.

28. The method of claim 27 wherein said vehicle service system comprises one of a vehicle wheel alignment system, a vehicle wheel balancing system, or a vehicle tire changing system.

29. An improved vehicle service device which is external to a vehicle, the vehicle service system having a computing device configured with at least one vehicle service software application, the improvement comprising:
  a communication means for operatively coupling the computing device directly with a vehicle internal communication bus on a vehicle undergoing service; and
  wherein the computing device is further configured with a software interface adapted to facilitate, through said communication means, bi-directional exchange of data with at least one component of a vehicle coupled to a vehicle internal communication bus utilizing a communication format which is independent of a specific hardware configuration of said vehicle component.

30. The improved vehicle service system of claim 29 wherein said computing device is configured to receive vehicle wheel alignment data from a vehicle wheel alignment sensor; and
  wherein said computing device is configured with at least one vehicle wheel alignment software application.

* * * * *